US012645825B2

(12) United States Patent
Kaufman et al.

(10) Patent No.: US 12,645,825 B2
(45) Date of Patent: Jun. 2, 2026

(54) CLIENT-SIDE ENCRYPTION WITH LOW-COST INTEGRITY CHECK

(71) Applicant: Dell Products L.P., Round Rock, TX (US)

(72) Inventors: Charles Kaufman, Redmond, WA (US); Radia J. Perlman, Redmond, WA (US)

(73) Assignee: Dell Products L.P., Round Rock, TX (US)

( * ) Notice: Subject to any disclaimer, the term of this patent is extended or adjusted under 35 U.S.C. 154(b) by 350 days.

(21) Appl. No.: 18/083,732

(22) Filed: Dec. 19, 2022

(65) Prior Publication Data

US 2024/0202355 A1 Jun. 20, 2024

(51) Int. Cl.
*G06F 21/62* (2013.01)
*G06F 21/60* (2013.01)
*G06F 21/78* (2013.01)

(52) U.S. Cl.
CPC ........ *G06F 21/6227* (2013.01); *G06F 21/602* (2013.01); *G06F 21/78* (2013.01)

(58) Field of Classification Search
CPC ..... G06F 21/6227; G06F 21/602; G06F 21/78
USPC .......................................................... 726/26
See application file for complete search history.

(56) References Cited

U.S. PATENT DOCUMENTS 5,491,752 A 2/1996 Kaufman et al.
5,778,395 A 7/1998 Whiting et al.

5,805,803 A 9/1998 Birrell et al.
5,892,828 A 4/1999 Perlman
9,195,851 B1 11/2015 Chandra
9,659,190 B1 5/2017 Perlman et al.
9,779,269 B1 10/2017 Perlman
9,906,361 B1 2/2018 Perlman et al.
10,284,534 B1 5/2019 Perlman et al.
10,298,551 B1 * 5/2019 Perlman ................ G06F 21/602
10,764,037 B2 * 9/2020 Yan ......................... H04L 9/088
10,819,700 B1 10/2020 Perlman (Continued)

FOREIGN PATENT DOCUMENTS

GB 2399435 A 9/2004
WO 2001052025 A2 7/2001
WO 2001052025 A3 5/2002

*Primary Examiner* — Linglan Edwards
*Assistant Examiner* — Phuc Pham
(74) *Attorney, Agent, or Firm* — Ryan, Mason & Lewis, LLP

(57) ABSTRACT

An apparatus in an illustrative embodiment comprises a client device configured for communication with a storage system, with the client device comprising a processor coupled to a memory. The client device is further configured to generate a data encryption key for a data item by computing a function of at least the data item, to encrypt the data item using the data encryption key for the data item, to encrypt the data encryption key using a secret key of the client device, and to send the encrypted data item and the encrypted data encryption key to the storage system for storage in the storage system. The client device is still further configured to retrieve the encrypted data item and the encrypted data encryption key from the storage system, and to perform an integrity check on the retrieved encrypted data item using a result of decrypting the retrieved encrypted data encryption key.

20 Claims, 5 Drawing Sheets

(56) References Cited

U.S. PATENT DOCUMENTS

| 11,019,033 | B1 | 5/2021 | Perlman et al. | |
| 11,042,629 | B2 | 6/2021 | Perlman et al. | |
| 11,128,460 | B2 | 9/2021 | Perlman et al. | |
| 11,374,769 | B2 | 6/2022 | Perlman et al. | |
| 2015/0371052 | A1 | 12/2015 | Lepeshenkov et al. | |
| 2020/0265021 | A1 | 8/2020 | Shatsky | |
| 2022/0209945 | A1* | 6/2022 | Li | H04L 9/0863 |
| 2022/0239471 | A1 | 7/2022 | Perlman et al. | |

* cited by examiner

Figure 2:
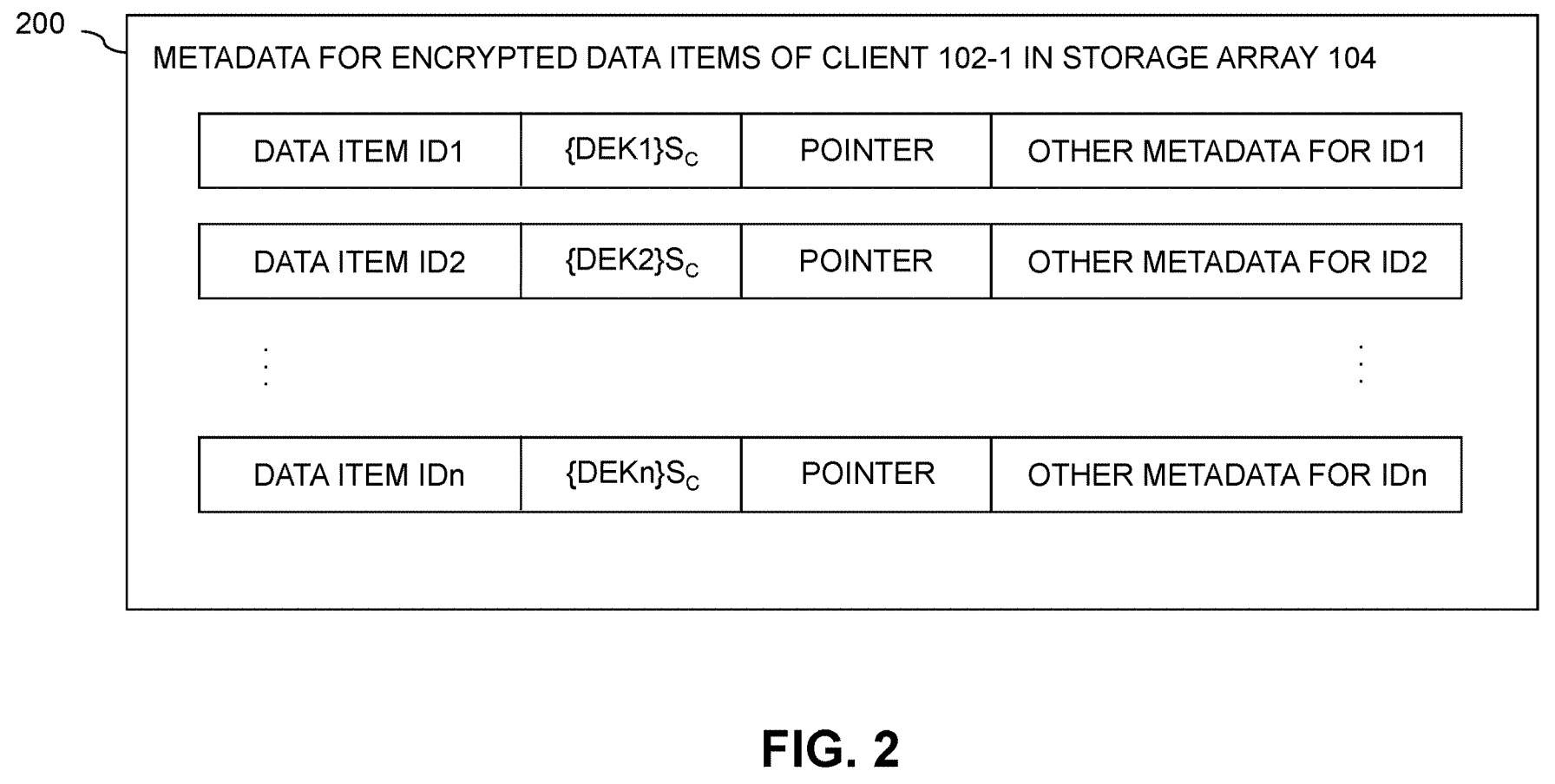

METADATA FOR ENCRYPTED DATA ITEMS OF CLIENT 102-1 IN STORAGE ARRAY 104

| DATA ITEM ID1 | {DEK1}$S_c$ | POINTER | OTHER METADATA FOR ID1 |
| DATA ITEM ID2 | {DEK2}$S_c$ | POINTER | OTHER METADATA FOR ID2 |
| DATA ITEM IDn | {DEKn}$S_c$ | POINTER | OTHER METADATA FOR IDn |

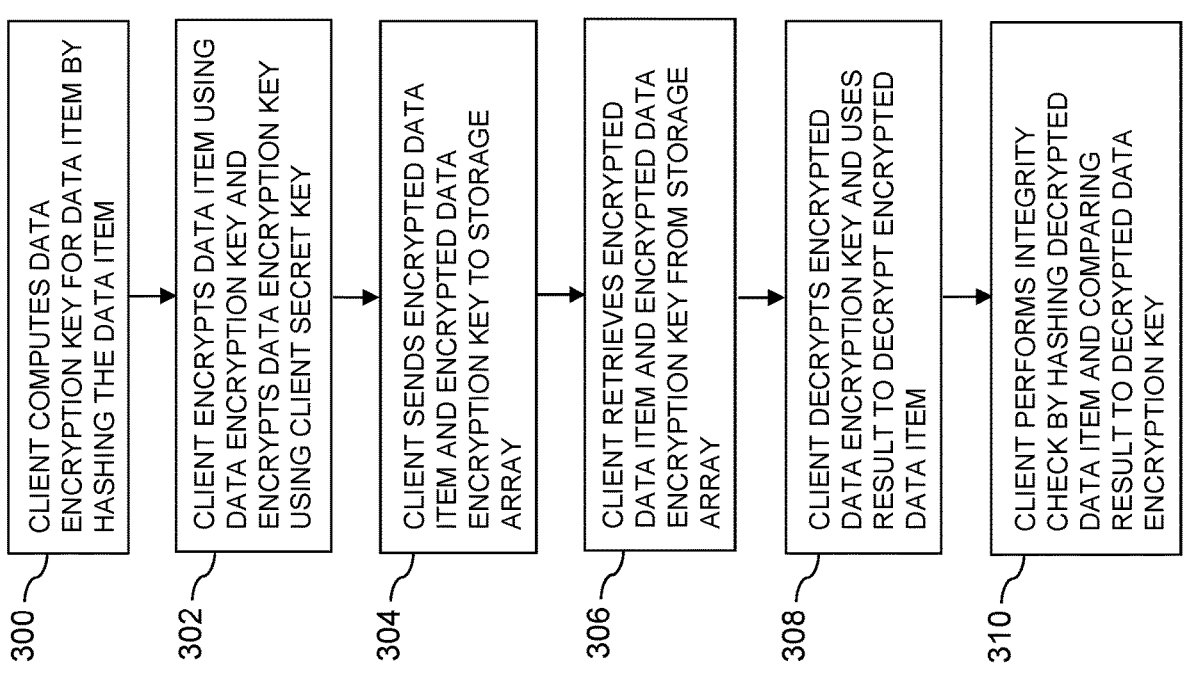

FIG. 3

300 — CLIENT COMPUTES DATA ENCRYPTION KEY FOR DATA ITEM BY HASHING THE DATA ITEM

302 — CLIENT ENCRYPTS DATA ITEM USING DATA ENCRYPTION KEY AND ENCRYPTS DATA ENCRYPTION KEY USING CLIENT SECRET KEY

304 — CLIENT SENDS ENCRYPTED DATA ITEM AND ENCRYPTED DATA ENCRYPTION KEY TO STORAGE ARRAY

306 — CLIENT RETRIEVES ENCRYPTED DATA ITEM AND ENCRYPTED DATA ENCRYPTION KEY FROM STORAGE ARRAY

308 — CLIENT DECRYPTS ENCRYPTED DATA ENCRYPTION KEY AND USES RESULT TO DECRYPT ENCRYPTED DATA ITEM

310 — CLIENT PERFORMS INTEGRITY CHECK BY HASHING DECRYPTED DATA ITEM AND COMPARING RESULT TO DECRYPTED DATA ENCRYPTION KEY

CLIENT-SIDE ENCRYPTION WITH LOW-COST INTEGRITY CHECK

FIELD

The field relates generally to cryptography, and more particularly to client-side data encryption techniques.

BACKGROUND

In many storage systems, data is stored under encryption utilizing one or more data encryption keys. Such systems are often configured to provide deduplication functionality for stored data items. Deduplication may generally refer to any of a variety of different processes designed to avoid storing duplicate data items in a storage system. The failure to implement an efficient deduplication process can be wasteful of storage resources, thereby potentially increasing storage system cost and complexity while also significantly undermining storage system performance.

Data encryption techniques implemented by a storage system are also referred to herein as "server-side" data encryption techniques, as the storage system itself encrypts data items supplied to it in plaintext form by one or more clients. Such clients are also referred to herein as "tenants" of the storage system, where the term "tenant" as broadly used herein is intended to encompass, for example, clients that are members of a common deduplication domain of the storage system.

Examples of server-side data encryption techniques supporting efficient deduplication across multiple tenants are disclosed in U.S. Pat. No. 9,779,269, entitled "Storage System Comprising Per-Tenant Encryption Keys Supporting Deduplication Across Multiple Tenants," which is incorporated by reference herein in its entirety.

Other data encryption techniques include what are referred to herein as "client-side" data encryption techniques, in which the data items are encrypted by the one or more clients and supplied to the storage system in encrypted form. Unfortunately, client-side data encryption can prevent effective deduplication, as multiple encryptions of the same plaintext data item, even by the same client, usually yield different ciphertexts that cannot be perceived as duplicates by the storage system. As a result, conventional client-side data encryption techniques typically require that the encryption keys utilized by a given client device to encrypt data items for storage in the storage system are also known to the storage system if the storage system is to perform deduplication over those data items. Such deduplication issues arise regardless of whether duplicate encrypted data items are submitted for storage by a single tenant or by multiple tenants. The conventional client-side encryption arrangements are therefore unsuitable for use in those storage contexts in which single or multiple tenants do not wish to disclose their encryption keys to the storage system.

More recently-developed client-side encryption techniques address these and other problems of the above-noted conventional approaches and are configured to provide support for deduplication in the storage system. Such techniques include those disclosed in U.S. Pat. No. 11,128,460, entitled "Client-Side Encryption Supporting Deduplication Across Single or Multiple Tenants in a Storage System," and U.S. patent application Ser. No. 17/159,903, filed Jan. 27, 2021 and entitled "Encrypted Data Storage System," both of which are incorporated by reference herein in their respective entireties.

Despite the considerable advances provided by these recently-developed client-side encryption techniques, a need remains for further improvements, particularly with regard to performance of integrity checks on retrieved encrypted data.

SUMMARY

Illustrative embodiments provide client-side encryption techniques that advantageously implement low-cost integrity checks for retrieved encrypted data. Some of these embodiments are further configured to allow a storage system to implement efficient deduplication across single or multiple tenants of a storage system without such tenants disclosing their encryption keys to the storage system, while also supporting the advantageous low-cost integrity checks. Such integrity checks are illustratively referred to herein "low-cost" integrity checks in that, for example, a given such integrity check can be implemented with little or no incremental cost in terms of storage, by taking advantage of information that is already stored for other reasons to verify the integrity of retrieved encrypted data. The integrity check in such embodiments is therefore low cost in terms of its utilization of storage resources.

In one embodiment, an apparatus comprises a client device configured for communication with a storage system, with the client device comprising a processor coupled to a memory. The client device is further configured to generate a data encryption key for a data item by computing a function of at least the data item, to encrypt the data item using the data encryption key for the data item, to encrypt the data encryption key using a secret key of the client device, and to send the encrypted data item and the encrypted data encryption key to the storage system for storage in the storage system. The client device is still further configured to retrieve the encrypted data item and the encrypted data encryption key from the storage system, and to perform an integrity check on the retrieved encrypted data item using a result of decrypting the retrieved encrypted data encryption key.

In some embodiments, performing an integrity check on the retrieved encrypted data item using a result of decrypting the retrieved encrypted data encryption key illustratively comprises decrypting the retrieved encrypted data encryption key using the secret key of the client device, decrypting the retrieved encrypted data item using the decrypted retrieved encrypted data encryption key, computing the function of at least the decrypted retrieved encrypted data item, and comparing a result of computing the function of at least the decrypted retrieved encrypted data item to the decrypted retrieved encrypted data encryption key.

The integrity check in such an embodiment illustratively passes if the result of computing the function of at least the decrypted retrieved encrypted data item is equivalent to the decrypted retrieved encrypted data encryption key, and the integrity check fails if the result of computing the function of at least the decrypted retrieved encrypted data item is not equivalent to the decrypted retrieved encrypted data encryption key.

In some embodiments, computing the function of at least the data item comprises at least hashing at least the data item. For example, hashing at least the data item illustratively comprises applying one or more secure hashing algorithms to at least the data item and in some embodiments possibly also a per-domain secret that is shared by multiple client devices within a deduplication domain of the storage system but not known to the storage system.

A wide variety of other types of hashing arrangements utilizing different hash functions can be used in implementing illustrative embodiments. Terms such as "hashing" and "hash function" as used herein are therefore intended to be broadly construed. Other types of functions of at least the data item not necessarily involving hashing of at least the data item can be used in other embodiments.

The client device in illustrative embodiments is associated with a first tenant of a deduplication domain of the storage system, and the deduplication domain includes one or more additional tenants. For example, the storage system may comprise a cloud storage system and the tenants may comprise respective tenants of the cloud storage system, although numerous other storage system arrangements are possible. References herein to "tenants" should therefore not be viewed as limited to cloud-based storage arrangements.

These and other illustrative embodiments include, without limitation, systems, apparatus, methods and computer program products comprising processor-readable storage media.

BRIEF DESCRIPTION OF THE DRAWINGS

FIG. 2 shows an example of metadata associated with data items subject to client-side encryption in an illustrative embodiment.

FIG. 3 is a flow diagram of an example client-side encryption process with low-cost integrity checks for retrieved encrypted data items in an illustrative embodiment.

DETAILED DESCRIPTION

Illustrative embodiments of the present disclosure will be described herein with reference to exemplary information processing systems, client devices and storage systems. It is to be appreciated, however, that embodiments of the disclosure are not restricted to use with the particular illustrative information processing system, client device and storage system configurations shown. For example, the term "storage system" as used herein is intended to be broadly construed, so as to encompass, for example, storage systems each comprising one or more storage arrays or other types and arrangements of storage products as well as cloud storage systems comprising virtual infrastructure.

Figure 1:
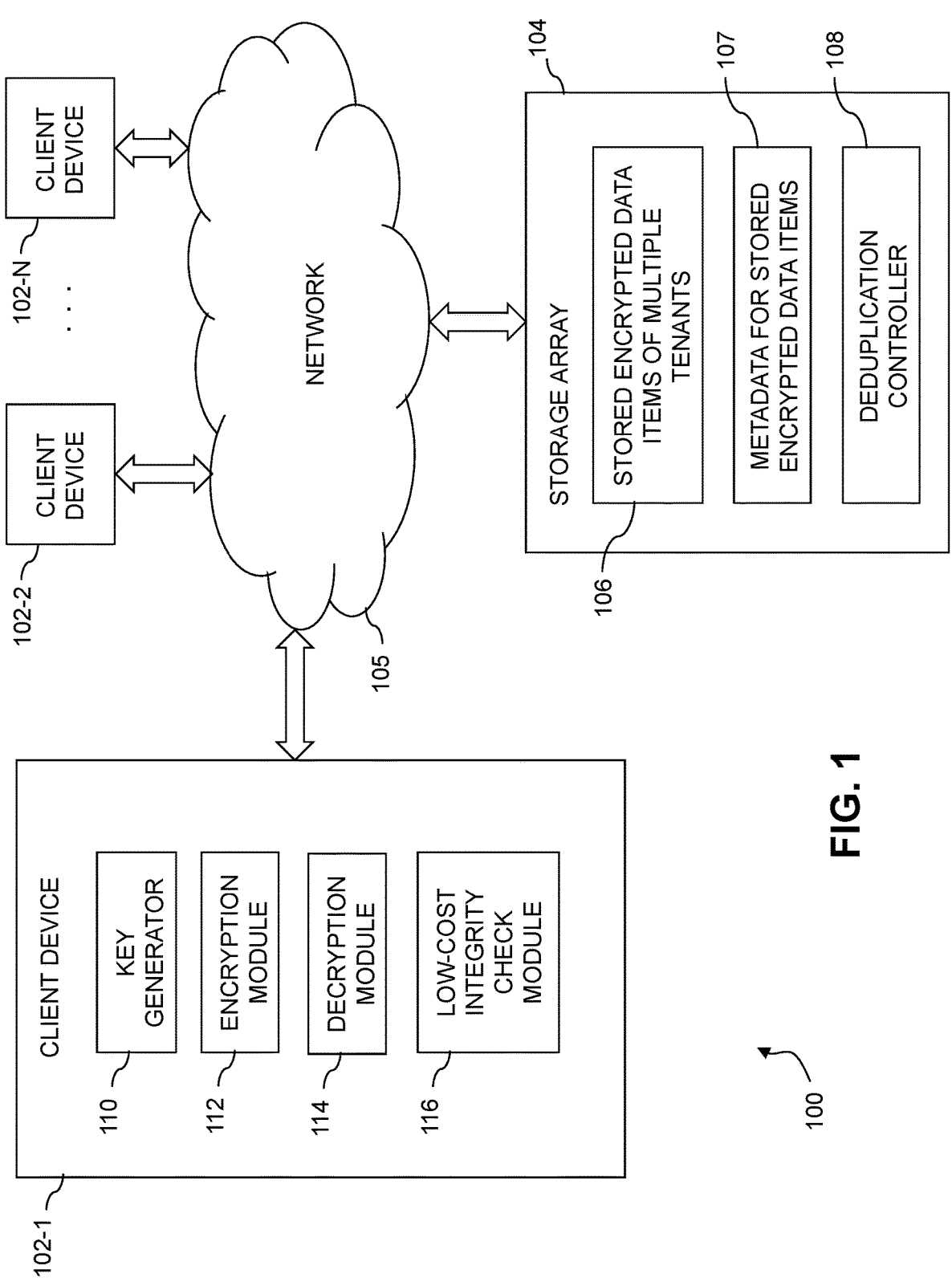
FIG. 1 is a block diagram of an information processing system configured to perform client-side encryption with low-cost integrity checks for retrieved encrypted data items in an illustrative embodiment.

FIG. 1 shows an information processing system 100 that comprises a plurality of client devices 102-1, 102-2, . . . 102-N that utilize a storage array 104. The client devices 102 communicate with the storage array 104 over a network 105. The storage array 104 comprises stored encrypted data items 106 of multiple tenants, and associated metadata 107 for the stored encrypted data items 106. The "tenants" as that term is broadly utilized herein illustratively comprise respective users associated with respective ones of the client devices 102. At least subsets of those tenants illustratively comprise respective members of at least one deduplication domain managed by a deduplication controller 108 of the storage array 104.

A given "tenant" as that term is broadly used herein can therefore refer to one of the client devices 102 and/or a corresponding user, and such a tenant may also be a member of a particular deduplication domain of the storage array 104.

The deduplication controller 108 is configured to run one or more deduplication processes in the storage array 104 in order to avoid storing duplicate data items in at least one deduplication domain of the storage array 104. In other embodiments, the deduplication controller 108 can be implemented at least in part externally to the storage array 104. For example, it can be implemented at least in part within one or more associated host devices that communicate with the storage array 104 over the network 105. The deduplication controller 108 illustratively implements, maintains or otherwise utilizes a deduplication directory to detect duplicate data items within a given deduplication domain.

In some embodiments, there is only a single deduplication domain that contains all or substantially all of the data storage space of the storage array 104. In such embodiments, all tenants of the storage array 104 are considered part of the same deduplication domain.

The deduplication controller 108 is implemented utilizing at least one processing device comprising a processor coupled to a memory. The same or different processing devices may be used to implement other portions of the storage array 104.

The deduplication controller 108 is configured to limit a total number of copies of a given data item that are stored for different ones of the tenants. For example, the deduplication controller 108 can be configured to ensure that only a single copy of a given stored encrypted data item is included in the storage array 104, even though multiple tenants have requested storage of that same encrypted data item within the system 100.

As a more particular example, the deduplication controller 108 can be configured to determine if a particular encrypted data item received from a given one of the tenants is a duplicate of an existing encrypted data item previously stored for the given tenant or another one of the tenants.

Numerous other types of deduplication are possible in the system 100. For example, the deduplication controller 108 can be configured to identify multiple copies of a given data item stored for different ones of the tenants, to delete all but a remaining one of the multiple copies and to update metadata associated with the remaining one of the multiple copies to include a pointer to the remaining single copy.

As indicated above, the storage array 104 includes stored encrypted data items 106 of multiple tenants, as well as associated metadata 107 for the stored encrypted data items 106. It should be noted that in other embodiments the associated metadata 107 or various portions thereof may be stored at alternative locations within the system 100, and such locations need not be proximate the stored encrypted data items 106 within the storage array 104.

The storage array 104 in some embodiments may be part of a cloud storage system and the multiple tenants may comprise respective tenants of the cloud storage system. In such an arrangement, encrypted data storage is provided to the tenants as a service of the service provider operating the cloud storage system. The term "tenant" as used herein should not be viewed as limited to such cloud-based storage arrangements.

The storage array 104 in some embodiments is implemented utilizing one or more commercially-available storage arrays, such as, for example, one or more flash-based storage arrays and/or various types of hybrid storage arrays comprising a combination of multiple storage device types.

The storage array 104 is an example of what is more generally referred to herein as a "storage system." The term "storage system" as used herein is intended to be broadly construed, and should not be viewed as being limited to storage arrays or any other storage system of a particular type. A given storage system as the term is broadly used herein can comprise, for example, network-attached storage (NAS), storage area networks (SANs), direct-attached storage (DAS) and distributed DAS, as well as combinations of these and other storage types, including software-defined storage.

Accordingly, storage systems can be implemented using software-defined storage products, cloud storage products, object-based storage products and/or scale-out NAS clusters comprising multiple distinct storage nodes. Combinations of multiple ones of these and other storage products can also be used in implementing a given storage system in an illustrative embodiment.

The stored encrypted data items 106 and associated metadata 107 are illustratively stored in general storage of the storage array 104. The storage array can additionally or alternatively include other types of storage, such as multiple different types of storage for different portions of the stored data.

The network 105 can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The network 105 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art. The term "network" as used herein is therefore intended to be broadly construed so as to encompass various protocols that utilize direct connections between the client devices 102 and the storage array 104.

The configuration of the client device 102-1 will now be described in further detail. Each of the other client devices 102-2 through 102-N is assumed to be configured in a manner similar to that described below for client device 102-1.

The client device 102-1 illustratively comprises a key generator 110, an encryption module 112, a decryption module 114 and a low-cost integrity check module 116. The key generator 110 is utilized to generate data encryption keys for use in performing client-side encryption of data items for storage in the storage array 104. The key generator 110 can also be used to generate one or more secret keys that are utilized in generating data encryption keys and in encrypting data encryption keys as described in more detail elsewhere herein. The encryption and decryption modules 112 and 114 are utilized to encrypt and decrypt data items in conjunction with storage in and retrieval from the storage array 104. These modules are also used to encrypt and decrypt the data encryption keys using a secret key of the client device 102-1. The low-cost integrity check module 116 is utilized to perform integrity checks on retrieved encrypted data items.

It is to be appreciated that this particular arrangement of components in the client device 102-1 is presented by way of example only, and alternative arrangements can be used in other embodiments. For example, the functionality associated with the components 110, 112, 114 and 116 in other embodiments can be distributed across a larger number of modules, or combined into a single module.

In some embodiments, components 110, 112, 114 and 116 are implemented in a cryptographic module of the client device 102-1. The cryptographic module can be implemented at least in part utilizing a trusted platform module or other type of trusted hardware of the client device 102-1. Such a trusted platform module provides highly secure storage for secret keys of the client device 102-1 and in some embodiments comprises or is otherwise associated with a key manager configured to control secure storage of the secret keys of the client device 102-1.

As mentioned previously, the client device 102-1 in the FIG. 1 embodiment is assumed to be implemented using at least one processing device. Each such processing device generally comprises at least one processor and an associated memory, and implements one or more functional modules for controlling certain features of the client device 102-1.

For example, the client device 102-1 in this embodiment illustratively comprises a processor coupled to a memory and a network interface.

The processor illustratively comprises a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory illustratively comprises random access memory (RAM), read-only memory (ROM), flash memory or other types of memory, in any combination. The memory and other memories disclosed herein may be viewed as examples of what are more generally referred to as "processor-readable storage media" storing executable computer program code or other types of software programs.

Articles of manufacture comprising such processor-readable storage media are considered embodiments of the present disclosure. A given such article of manufacture may comprise, for example, a storage device such as a storage disk, an integrated circuit containing electronic memory, or a wide variety of other types of computer program products comprising processor-readable storage media. The term "article of manufacture" as used herein should be understood to exclude transitory, propagating signals.

The network interface allows the client device 102-1 to communicate with the storage array 104 over the network 105. The network interface illustratively comprises one or more conventional transceivers.

Particular components of the client device 102-1, such as one or more of key generator 110, encryption module 112, decryption module 114 and low-cost integrity check module 116, are illustratively implemented at least in part in the form of software that is stored in the memory of the client device 102-1 and executed by the processor of the client device 102-1.

As mentioned previously, the components 110, 112, 114 and 116 are utilized in performing client-side encryption and decryption operations, and associated integrity checks for retrieved encrypted data items, relating to the stored encrypted data items 106 and the associated metadata 107 of the storage array 104.

Such operations in the present embodiment illustratively involve generating data encryption keys and utilizing those data encryption keys to encrypt respective ones of the data items for storage in the storage array 104. The resulting encrypted data item is stored in the storage array 104 as one of the stored encrypted data items 106. Furthermore, the given encrypted data item as stored in the stored encrypted data items 106 has its corresponding metadata stored in the associated metadata 107. That corresponding metadata includes the particular data encryption key encrypted using a secret key of the client device 102-1.

In some embodiments, the client device 102-1 is configured to generate a data encryption key for a data block or other type of data item by computing a function of at least the data item, to encrypt the data item using the data encryption key for the data item, to encrypt the data encryption key using a secret key of the client device 102-1, and to send the encrypted data item and the encrypted data encryption key to the storage array 104 for storage therein. The client device 102-1 is further configured to retrieve the encrypted data item and the encrypted data encryption key from the storage array 104, and to perform an integrity check on the retrieved encrypted data item using a result of decrypting the retrieved encrypted data encryption key.

In some embodiments, performing an integrity check on the retrieved encrypted data item using a result of decrypting the retrieved encrypted data encryption key illustratively comprises decrypting the retrieved encrypted data encryption key using the secret key of the client device 102-1, decrypting the retrieved encrypted data item using the decrypted retrieved encrypted data encryption key, computing the function of at least the decrypted retrieved encrypted data item, and comparing a result of computing the function of at least the decrypted retrieved encrypted data item to the decrypted retrieved encrypted data encryption key.

In such an embodiment, the integrity check passes if the result of computing the function of at least the decrypted retrieved encrypted data item is equivalent to the decrypted retrieved encrypted data encryption key, and the integrity check fails if the result of computing the function of at least the decrypted retrieved encrypted data item is not equivalent to the decrypted retrieved encrypted data encryption key.

Compression of the data item can be implemented by the client device 102-1 in some embodiments. For example, generating a data encryption key for a data item by computing a function of at least the data item in some embodiments comprises compressing the data item to generate a compressed data item and generating the data encryption key as a function of at least the compressed data item. In other embodiments, the data item can be compressed after the data encryption key is generated. It will be appreciated by those skilled in the art that suitable adjustments can be made to the above-described integrity check to account for compression of the data item in embodiments that utilize such compression. However, the use of compression is not required in embodiments disclosed herein.

The encrypted data encryption key is illustratively stored in the storage array 104 as metadata of the encrypted data item. Other types of information can be included within the metadata of the encrypted data item. For example, the metadata of the encrypted data item in some embodiments further comprises a pointer to a storage location of the encrypted data item in the storage array 104.

An example arrangement for encrypting the data encryption key is to include it in metadata that is then encrypted when the metadata is stored. In such an arrangement, the data encryption keys associated with respective data items would not be individually encrypted, but rather would be encrypted with others in a block of metadata. That block of metadata might be encrypted not only with a key known to the client, but with a key computed from a hash of the block of metadata in a recursive implementation of the client-side encryption techniques disclosed herein. Arrangements of this type are considered examples of encrypting a data encryption key using a secret key of the client device, as that terminology is broadly used herein.

In some embodiments, computing the function of at least the data item to generate the data encryption key for the data item illustratively comprises at least hashing at least the data item. For example, hashing at least the data item illustratively comprises applying one or more secure hashing algorithms to at least the data item.

As another example, hashing at least the data item illustratively comprises applying one or more secure hashing algorithms to at least the data item and a per-domain secret that is shared by multiple ones of the client devices 102 within a particular deduplication domain of the storage array 104 but not known to the storage array 104.

In some embodiments, computing a function of at least the data item to generate the data encryption key for the data item illustratively comprises computing a function of the data item and a per-domain secret shared by respective ones of multiple client devices 102 but not known to the storage array 104.

The multiple client devices 102, or particular subsets thereof, may be associated with respective distinct tenants of a deduplication domain of the storage array 104.

Some embodiments utilize one or more particular designated secure hashing algorithms (SHAs), such as SHA256 or SHA512, although other types of hash functions can be used in other embodiments. Such hash functions are illustratively configured to generate a fixed-length value utilizing at least the data item, with the fixed-length value having a length that is substantially less than a length of the data item itself.

A wide variety of other types of hashing can be used in computing a function of at least the data item to generate the data encryption key for the data item, and terms such as "hashing" and "hash function" as used herein are intended to be broadly construed.

The hashing of at least the data item can additionally or alternatively be characterized as generating a fixed-length value utilizing at least the data item, with the fixed-length value having a length that is less than a length of the data item itself, and more specifically substantially less than the length of the data item.

Other embodiments can use different functions of the data item that do not necessarily involve hashing of at least the data item.

It should be noted that the term "data item" as used is intended to be broadly construed, so as to encompass, for example, a block, file, object or other grouping of data suitable for storage in the storage system. Numerous other arrangements are possible. For example, combinations of multiple blocks, files, objects or other groupings of data can also be considered a single "data item" as that term is broadly used herein.

In some embodiments, the client device 102-1 is associated with a first tenant of a deduplication domain of the storage array 104 and the deduplication domain includes one or more additional tenants, possibly associated with respective other ones of the client devices 102-2 through 102-N.

In the above-described embodiments, the client device 102-1 is illustratively configured to encrypt plaintext data items in such a way that the resulting encrypted data items will be the same if the plaintext data items are the same, so that the deduplication process in the storage array 104 can effectively eliminate duplicate encrypted data items.

As mentioned previously, this is achieved in some embodiments by the client device 102-1 generating a data encryption key that is a function of at least the plaintext data item, and possibly additional secret information. Other techniques may be used in other embodiments to ensure that duplicate plaintext data items yield duplicate encrypted data items.

Illustrative embodiments are therefore configured to ensure that the same plaintext data item when encrypted will always yield the same ciphertext, thereby supporting effective deduplication in the storage array 104, while also supporting low-cost integrity checks for retrieved encrypted data items as disclosed herein. Such embodiments are advantageous in both single-tenant and multiple-tenant storage contexts.

Additional examples of techniques for generating a data encryption key for a data item by computing a function of at least the data item can be found in the above-cited U.S. Pat. No. 11,128,460, and U.S. patent application Ser. No. 17/159,903.

As noted above, each of the other client devices 102-2 through 102-N is assumed to be configured in a manner similar to that described above for client device 102-1.

Also, the particular arrangements described above are just examples, and numerous other client-side data encryption arrangements can be used to encrypt data items in a manner that supports deduplication and low-cost integrity checks in other embodiments.

FIG. 2 shows an example of the above-noted metadata, for multiple data items subject to client-side encryption by the client device 102-1. This metadata 200 represents a portion of the associated metadata 107 maintained by the storage array 104 for stored encrypted data items 106. More particularly, the metadata 200 illustrated in the figure includes identifiers ID1, ID2, . . . IDn of respective data items that were encrypted by the client device 102-1 using respective data encryption keys DEK1, DEK2, . . . DEKn. These data encryption keys are stored as part of the metadata 200, in an encrypted form using a secret key $S_C$ that is known to client device 102-1 but not known to the storage array 104 or to the client devices of any other tenants of the storage array 104. The encrypted data encryption keys are denoted $\{DEK1\}S_C$, $\{DEK2\}S_C$, . . . $\{DEKn\}S_C$ in the figure. The secret key $S_C$ of FIG. 2 is an example of a secret key of a client device referred to above and elsewhere herein.

Each of the entries of the metadata 200 further comprises a pointer to the storage location of the corresponding encrypted data item in the storage array 104, and possibly other types of metadata utilized by the storage array 104. It is to be appreciated that this particular arrangement of metadata 200 including identifiers of encrypted data item, encrypted data encryption keys, pointers and possibly other types of metadata, is only an example, and not intended to be limiting in any way. Other tenants for which encrypted data items are stored by the storage array 104 will each have an arrangement of metadata similar to metadata 200 of FIG. 2 for its particular stored encrypted data items.

Additional examples of client-side encryption performed in system 100 will now be described in more detail. In these examples, it is assumed that the client devices comprise or are otherwise associated with respective distinct tenants of the storage array 104. Thus, a given "client" may be referred to as a tenant, and vice-versa. The data items in these examples are referred to as "blocks" but other types of data items can be used in other embodiments, such as sets of multiple blocks.

The client-side encryption techniques disclosed in the above-cited U.S. patent application Ser. No. 17/159,903 include techniques that allow a client device to encrypt data blocks and send the encrypted data blocks to a block-oriented storage system, in a manner that allows the storage system to perform deduplication on the encrypted data blocks, so as to avoid impacting the storage savings provided by deduplication. In such an arrangement, the storage system will not have access to the cryptographic keys used by the client device to encrypt the data blocks, nor will it have access to the plaintext data blocks.

However, a problem can arise in these and other client-side encryption arrangements when a client attempts to read encrypted data from the storage system. For example, a malicious server in a storage system could send "garbage" blocks instead of authentic encrypted data blocks to a client when the client attempts to read the encrypted data blocks. Conventional approaches often do not address this threat, although it could be addressed in some contexts through utilization of a cryptographic integrity check value (ICV), such as a public key-based digital signature or a secret key-based value such as a message authentication code (MAC), the latter which may be more particularly implemented as a hash-based MAC (HMAC). Unfortunately, these and other ICVs can introduce significant additional complexities, such as requirements for additional metadata and corresponding overhead for generating the ICV.

Illustrative embodiments disclosed herein overcome these and other drawbacks of conventional practice by providing client-side encryption with a low-cost integrity check. In some embodiments, the low-cost integrity check is provided without adding any additional metadata over that utilized by a given client-side encryption arrangement, such as that disclosed in the above-cited U.S. patent application Ser. No. 17/159,903.

For example, a given technique disclosed in U.S. patent application Ser. No. 17/159,903 is configured such that all clients in the same deduplication domain encrypt blocks in a manner that ensures that the same plaintext block encrypts to the same ciphertext block, so that the resulting ciphertext block can be deduplicated in the storage system. Each of the clients in such an arrangement has its own encryption keys so that one of the clients cannot decrypt a block stored by another one of the clients.

An example of client-side encryption with a low-cost integrity check using the techniques disclosed herein will now be described. In this example, it is assumed that the client encrypts a data block using a per-block key which is computed as a hash of the plaintext of the data block, although it is to be appreciated that other client-side encryption arrangements can be used in other embodiments. As will be described, in this illustrative example, the integrity check is provided without the need to add a MAC or other ICV to the data block, and therefore at low complexity relative to conventional approaches.

In the present example, assume that client C, which illustratively corresponds to client device 102-1 in the FIG.

embodiment, would like to encrypt a plaintext block B for storage in a storage system such as storage array 104.

The client-side encryption algorithm proceeds as follows in order to write the plaintext block B to the storage system in encrypted form:

1. Client C computes the hash of plaintext block B, hash(B), with the result being denoted herein as $H_B$, where $H_B$ is the per-block encryption key for plaintext block B, and "hash" denotes a specified hash function, such as a particular implementation of an SHA (e.g., SHA256 or SHA512), or a combination of multiple such hash functions, although other types of functions can additionally or alternatively be used. In some embodiments, a per-domain secret, shared by all clients within a given deduplication domain of the storage system, is also hashed into the computation of $H_B$, illustratively utilizing techniques disclosed in one or more of the above-cited U.S. Pat. No. 11,128,460, and U.S. patent application Ser. No. 17/159,903. Additionally or alternatively, a compression operation could be performed on the plaintext block B by the client, as described elsewhere herein.

2. Client C encrypts plaintext block B using the per-block encryption key $H_B$, with the result being denoted herein as $\{B\}H_B$, where $\{B\}H_B$ is the ciphertext corresponding to plaintext block B. The per-block encryption key $H_B$ is an example of what is more generally referred to herein as a "data encryption key."

3. Client C generates metadata for $\{B\}H_B$ that will be associated with $\{B\}H_B$, and that will be required to decrypt $\{B\}H_B$. More particularly, client C generates the metadata by encrypting $H_B$ using its own secret key $S_C$, with the result being denoted herein as $\{H_B\}S_C$.

4. Client C writes the encrypted block $\{B\}H_B$ by storing both $\{B\}H_B$ and its associated metadata $\{H_B\}S_C$ to the storage system.

In order to read the encrypted block $\{B\}H_B$ from the storage system, the following algorithm is executed by client C:

1. Client C retrieves the encrypted data block $\{B\}H_B$ and its corresponding metadata $\{H_B\}S_C$ from the storage system.

2. Client C decrypts $\{H_B\}S_C$ utilizing its secret key $S_C$ to obtain $H_B$.

3. Client C decrypt $\{B\}H_B$ with $H_B$ to obtain the plaintext block B.

As indicated previously, a malicious server in the storage system could send a "garbage" block instead of an authentic encrypted data block to client C when client C attempts to read the encrypted data block using the above algorithm. Additionally or alternatively, the storage system could send a "garbage" metadata block instead of an authentic metadata block. In these and other situations, an integrity check is illustratively performed by client C in order to detect such garbage blocks.

More particularly, the integrity check is performed in the present example utilizing the following algorithm:

1. Client C obtains $H_B$ and B in the manner described previously.

2. Client C computes hash(B), where "hash" denotes the same hash function used to compute $H_B$ from B as part of the above-described encryption algorithm. If the block was encrypted according to the algorithm described above, then hash(B) should equal $H_B$.

3. Client C performs the integrity check by comparing hash(B) to $H_B$ and verifying that hash(B) is equal to $H_B$. Accordingly, if the two values are equal, the integrity check is passed, and otherwise the integrity check does not pass and the presence of a garbage block is indicated.

With the above example integrity check, no malicious entity can trick the client with respect to the encrypted data block. For example, in order to create an encrypted block with the appropriate associated metadata, the malicious entity would need to know the secret key $S_C$, but the client-side encryption arrangement in this embodiment does not require any entity other than client C to know the secret key $S_C$.

This illustrative embodiment therefore provides a per-block integrity check with no additional metadata or associated metadata storage other than that already utilized by the client-side encryption technique itself. Moreover, it requires only minimal additional computation, namely, computing a hash of the decrypted plaintext and comparing it with the per-block encryption key. Accordingly, the integrity check in this embodiment is provided at relatively low complexity.

It is to be understood that the particular set of elements shown in FIG. 1 for implementing client-side encryption supporting deduplication across single or multiple tenants and low-cost integrity checks for retrieved encrypted data items is presented by way of illustrative example only, and in other embodiments additional or alternative elements may be used. Thus, another embodiment may include additional or alternative systems, devices and other entities, as well as different arrangements of modules and other components.

For example, some embodiments can implement at least one cryptographic module, not shown in the figure, that incorporates the key generator 110, the encryption module 112, the decryption module 114 and the low-cost integrity check module 116, or subsets of these components.

As another example, other embodiments can configure the client device 102-1 to include an input-output controller, also not shown in the figure, that operates in cooperation with a cryptographic module, or other arrangements of components similarly configured to control storage of encrypted data items in the storage array 104. Such an input-output controller can obtain keys from the cryptographic module for use in performing client-side encryption of data items for storage in the storage array 104.

In an embodiment of this type, the encryption and decryption modules 112 and 114, and possibly also the low-cost integrity check module 116, can be implemented in the input-output controller rather than in the cryptographic module. Alternatively, the input-output controller can include its own encryption and decryption modules, and an associated low-cost integrity check module, in addition to those of the cryptographic module. Other placements of encryption and decryption modules, and their associated low-cost integrity check module, are possible in other embodiments.

It is also possible that the cryptographic module can be implemented at least in part within the input-output controller, or that the input-output controller can be implemented at least in part within the cryptographic module.

At least portions of the client devices 102 and storage array 104 may be implemented using one or more processing platforms, as will be described in more detail below in conjunction with the illustrative embodiments of FIGS. 4 and 5. A given such processing platform includes at least one processing device comprising a processor coupled to a memory, and the one or more processing devices may be implemented at least in part utilizing one or more virtual machines or other types of virtualization infrastructure such as Linux containers (LXCs) in association with underlying physical hardware.

It is to be appreciated that a given embodiment of the system 100 may include multiple instances of the storage array 104 and its deduplication controller 108, although only a single instance of each of these elements is shown in the system diagram for clarity and simplicity of illustration.

Accordingly, the particular set of components implemented in the system 100 as illustrated in FIG. 1 is presented by way of example only. In other embodiments, alternative sets of components may be used, and such components may exhibit alternative functionality and configurations.

An example illustrating the operation of the information processing system 100 will now be described with reference to the flow diagram of FIG. 3. The process as shown includes steps 300 through 310, and is suitable for use in the system 100 but is more generally applicable to other systems implementing client-side encryption supporting deduplication across single or multiple tenants and associated functionality for performing low-cost integrity checks for retrieved encrypted data items as disclosed herein. Also, the process represents just one example of a type of client-side encryption that can be implemented in a client device, and a wide variety of alternative arrangements can be used. In the following description of the process, the client device performing the client-side encryption is referred to as simply a "client." Such a client may be one of a plurality of tenants of a deduplication domain of a storage array or other type of storage system, with each such tenant of the deduplication domain also being referred to herein as a "member" of the deduplication domain. It is also possible that the client is the only tenant in the deduplication domain, or that the storage system supports only a single deduplication domain for multiple tenants.

In step 300, the client computes a data encryption key for a plaintext data item by hashing the data item using one or more secure hashing algorithms or other hash functions, or combinations of multiple hash functions, as described elsewhere herein. Other types of functions not necessarily involving hashing of at least the data item can additionally or alternatively be used. The client identifies the plaintext data item to be encrypted for storage in the storage array by, for example, retrieving the plaintext data item from its local memory or other local storage device, for subsequent encryption and delivery in encrypted form to the storage array. As mentioned previously, other embodiments can utilize other types of storage systems.

In step 302, the client encrypts the data item using the data encryption key and encrypts the data encryption key using a secret key of the client.

In step 304, the client sends the encrypted data item and the encrypted data encryption key to the storage array for storage therein. For example, the storage array 104 illustratively stores the encrypted data item as one of the stored encrypted data items 106 in the FIG. 1 embodiment, and the storage array 104 illustratively stores the encrypted data encryption key as part of the associated metadata 107 in the FIG. 1 embodiment.

In step 306, the client retrieves the encrypted data item and the encrypted data encryption key from the storage array. A significant amount of time may elapse between the storage of the encrypted data encrypted data item and the encrypted data encryption key in the storage array in step 304, and the retrieval of the encrypted data encrypted data item and the encrypted data encryption key from the storage array in step 306.

In step 308, the client uses its secret key to decrypt the encrypted data encryption key retrieved from the storage array and then uses the resulting decrypted data encryption key to decrypt the encrypted data item retrieved from the storage array.

In step 310, the client performs a low-cost integrity check by hashing the decrypted data item, using the same hashing process previously applied to the data item in step 300, and then comparing the result to the decrypted data encryption key. If the result of hashing the decrypted data item matches the decrypted data encryption key, the integrity check passes and the retrieved encrypted data item has been verified as correct. Otherwise, the integrity check fails, and the client knows that there is an issue with the retrieved encrypted data item. For example, a malicious server of the storage array may have returned "garbage" data rather than authentic encrypted data in response to a client read request. As another example, accidental data corruption may have occurred in the storage array, its memory devices, or the network connecting the client and the storage array.

The integrity check in this embodiment exhibits low complexity at least in part because it does not require any additional metadata beyond that already captured as part of the client-side encryption of the data item and the data encryption key in steps 300 and 302.

The client-side encryption process of FIG. 3 advantageously supports efficient deduplication across single or multiple tenants of the storage array with low-cost integrity checks for retrieved encrypted data items.

As indicated previously, the term "data item" as used herein is intended to be broadly construed so as to encompass, for example, a block, file, object or other grouping of data suitable for storage in the storage system.

The exemplary FIG. 3 client-side encryption process ensures that a given data item presented for storage in the storage array by multiple tenants is stored only once, encrypted under the data encryption key for that data item, but is associated with metadata that illustratively includes a pointer to the single copy of the stored encrypted data item. Thus, each tenant that presented the encrypted data item for storage in the storage array can access the stored encrypted data item, but duplicate copies of the data items are detected and eliminated, and storage efficiency is improved. Moreover, the process advantageously supports low-cost integrity checks for retrieved encrypted data items.

The FIG. 3 process may be viewed as an example of a processing algorithm carried out in the system 100 by cooperative interaction of a given one of the client devices 102 and the storage array 104. As mentioned previously, each of the client devices 102 is assumed to be configured to execute such a processing algorithm in performing client-side encryption of data items for storage in the storage array 104 and associated low-cost integrity checks upon retrieval of encrypted data items from the storage array 104. For example, key generator 110 of client device 102-1 illustratively performs step 300, encryption module 112 of client device 102-1 illustratively performs step 302 and possibly at least portions of step 304, decryption module 114 of client device 102-1 illustratively performs step 308 and possibly at least portions of step 306, and low-cost integrity check module 116 illustratively performs step 310, although other arrangements are possible.

The particular processing operations and other system functionality described in conjunction with the flow diagram of FIG. 3 are presented by way of illustrative example only, and should not be construed as limiting the scope of the present disclosure in any way. Alternative embodiments can use other types of processing operations involving client-side encryption and associated deduplication across single or multiple tenants, with low-cost integrity checks for retrieved encrypted data items as disclosed herein. For example, the ordering of the process steps may be varied in other embodiments, or certain steps may be performed concurrently with one another rather than serially. As additional examples, different instances of the process can be performed for different sets of data items or different client devices, and such instances can be performed at least in part in parallel with one another within a given system for different data sets or different client devices.

Also, functionality such as that described in conjunction with the flow diagram of FIG. 3 can be implemented at least in part in the form of one or more software programs stored in memory and executed by a processor of a processing device such as a computer or server. As mentioned previously, a client device memory or other storage device having executable program code of one or more software programs embodied therein is an example of what is more generally referred to herein as a "processor-readable storage medium."

The foregoing embodiments are therefore illustrative only, and should not be viewed as limiting the scope of any particular embodiment in any way. Those skilled in the art will appreciate that numerous alternative per-tenant key arrangements can be used in other embodiments.

Illustrative embodiments provide a number of significant advantages relative to conventional arrangements.

For example, one or more such embodiments advantageously provide functionality for performance of low-cost integrity checks for encrypted data items retrieved by a client device from a storage system.

A given such low-cost integrity check can detect, for example, a situation in which a malicious server of the storage array returns "garbage" data rather than authentic encrypted data in response to a client read request.

A low-cost integrity check as disclosed herein can detect numerous other issues that may result in corruption of retrieved encrypted data. As another example, accidental data corruption may have occurred in the storage array, its memory devices, or the network connecting the client and the storage array.

The low-cost integrity checks are performed in some embodiments without the need for an HMAC or other MAC, or any other additional metadata beyond that already utilized in a corresponding client-side encryption process configured to support deduplication across single or multiple tenants in a storage system.

These embodiments are configured to ensure that single or multiple tenants that encrypt the same plaintext data item multiple times will produce the same encrypted data item each time, thereby allowing the storage system to detect duplicate encrypted data items, while also supporting the performance of low-cost integrity checks without the need for any additional metadata such as HMACs or other MACs.

Such embodiments can provide more efficient use of storage resources in single-tenant or multi-tenant storage systems, potentially leading to cost and complexity reductions and associated performance improvements.

Moreover, these and other embodiments do not require any changes to the client-side encryption process performed by a client device or the deduplication process performed by the storage system.

The above-noted advantages and other advantages described herein are present in certain illustrative embodiments and need not be present in other embodiments.

As indicated previously, components of a client device as disclosed herein can be implemented at least in part in the form of one or more software programs stored in memory and executed by a processor of a processing device. For example, at least portions of the client-side encryption functionality of a given one of the client devices 102 are illustratively implemented at least in part in the form of software.

Illustrative embodiments of processing platforms utilized to implement processing devices with functionality for low-cost integrity checks for retrieved encrypted data items will now be described in greater detail with reference to FIGS. 4 and 5. Although described in the context of system 100, these platforms may also be used to implement at least portions of other information processing systems in other embodiments.

Figure 4:
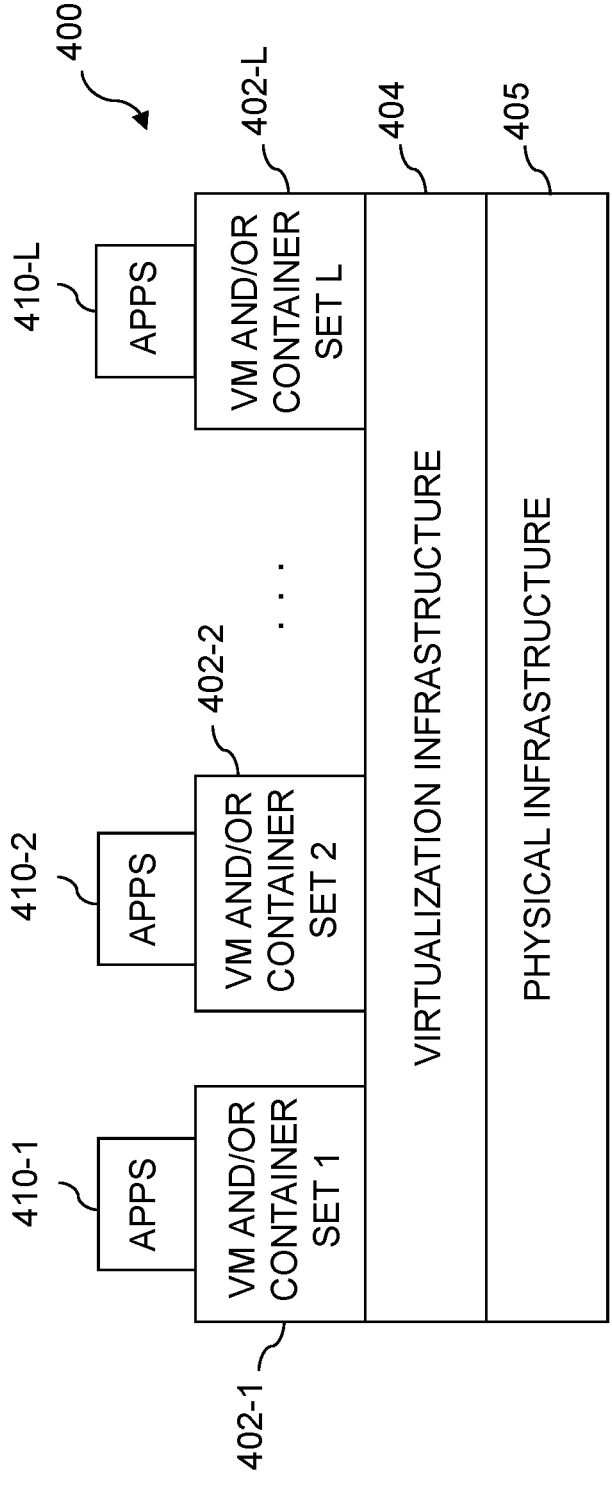
FIGS. 4 and 5 show examples of processing platforms that may be utilized to implement at least a portion of an information processing system in illustrative embodiments.
Figure 5:
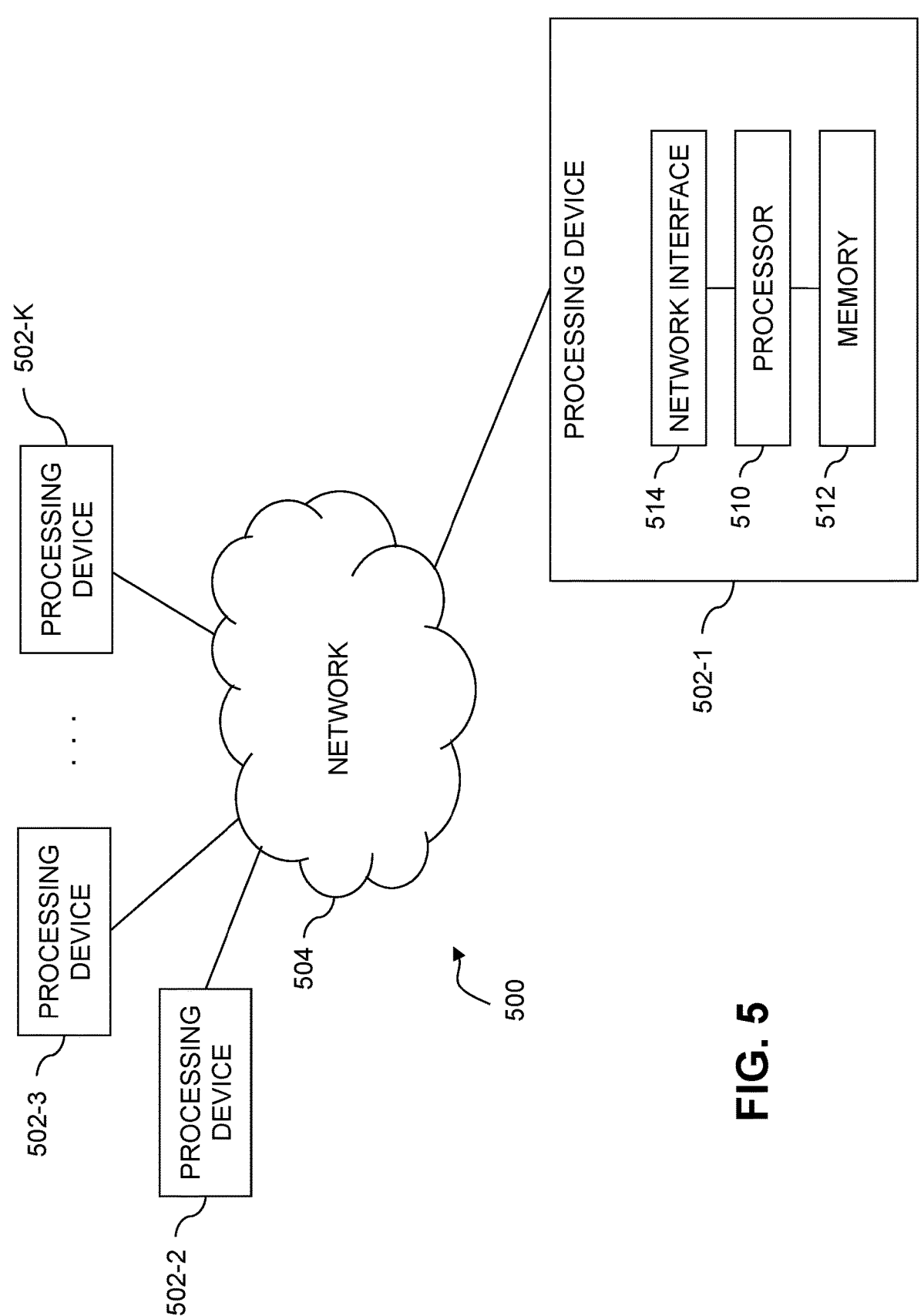

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide at least portions of the disclosed client-side encryption and low-cost integrity check functionality in an information processing system of the type described above using one or more processes running on a given one of the VMs. For example, each of the VMs can implement logic instances and/or other components providing functionality associated with low-cost integrity checks for retrieved encrypted data items in the system 100.

A hypervisor platform may be used to implement a hypervisor within the virtualization infrastructure 404. Such a hypervisor platform may comprise an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can also provide at least portions of the disclosed client-side encryption and low-cost integrity check functionality in an information processing system of the type described above. For example, a container host device supporting multiple containers of one or more container sets can implement logic instances and/or other components providing functionality associated with low-cost integrity checks for retrieved encrypted data items in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an ASIC, an FPGA, a GPU or other type of processing circuitry, as well as portions or combinations of such circuitry elements.

The memory 512 may comprise RAM, ROM, flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for low-cost integrity checks for retrieved encrypted data items provided by one or more components of an information processing system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, client devices, storage systems, key generators, encryption and decryption modules, low-cost integrity check modules and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

a client device configured for communication with a storage system;

the client device comprising a processor coupled to a memory;

the client device being further configured:

to generate a data encryption key for a data item at least in part by computing a function of at least the data item, wherein computing the function of at least the data item comprises applying one or more secure hashing algorithms to at least the data item and a per-domain secret the per-domain secret being shared by multiple client devices within a deduplication domain of the storage system but not known to the storage system;

to encrypt the data item using the data encryption key for the data item;

to encrypt the data encryption key using a secret key of the client device, the data encryption key thereby being encrypted under the secret key of the client device, the secret key being different than the data encryption key, wherein the secret key is stored in a trusted platform module of the client device, and the encryption of the data encryption key is performed in the trusted platform module using the secret key stored therein;

to send the encrypted data item and the encrypted data encryption key from the client device to the storage system for storage therein;

to retrieve, in the client device, the encrypted data item and the encrypted data encryption key from the storage system; and to perform, in the client device, an integrity check on the retrieved encrypted data item using a result of decrypting the retrieved encrypted data encryption key;

wherein performing an integrity check on the retrieved encrypted data item using a result of decrypting the retrieved encrypted data encryption key comprises:

decrypting the retrieved encrypted data encryption key using the secret key of the client device, wherein the decryption of the data encryption key is performed in the trusted platform module of the client device using the secret key stored therein, without requiring the involvement of any other device;

decrypting the retrieved encrypted data item using the decrypted retrieved encrypted data encryption key;

computing the function of at least the decrypted retrieved encrypted data item; and comparing a result of computing the function of at least the decrypted retrieved encrypted data item to the decrypted retrieved encrypted data encryption key;

wherein the integrity check passes if the result of computing the function of at least the decrypted retrieved encrypted data item is equivalent to the decrypted retrieved encrypted data encryption key, and the integrity check fails if the result of computing the function of at least the decrypted retrieved encrypted data item is not equivalent to the decrypted retrieved encrypted data encryption key.

2. The apparatus of claim 1 wherein the integrity check is performed in its entirety within the trusted platform module of the client device.

3. The apparatus of claim 1 wherein generating a data encryption key for a data item by computing a function of at least the data item comprises compressing the data item to generate a compressed data item and generating the data encryption key as a function of at least the compressed data item.

4. The apparatus of claim 1 wherein the encrypted data encryption key is stored in the storage system as metadata of the encrypted data item.

5. The apparatus of claim 4 wherein the metadata of the encrypted data item further comprises a pointer to a storage location of the encrypted data item in the storage system.

6. The apparatus of claim 1 wherein computing a function of at least the data item comprises computing a function of the data item and the per-domain secret shared by the multiple client devices but not known to the storage system.

7. The apparatus of claim 1 wherein the multiple client devices are associated with respective distinct tenants of the deduplication domain of the storage system.

8. A computer program product comprising a non-transitory processor-readable storage medium having stored therein program code of one or more software programs, wherein the program code when executed by a client device comprising a processor coupled to a memory, the client device being configured to communicate with a storage system, causes said client device:

to generate a data encryption key for a data item at least in part by computing a function of at least the data item, wherein computing the function of at least the data item comprises applying one or more secure hashing algorithms to at least the data item and a per-domain secret the per-domain secret being shared by multiple client devices within a deduplication domain of the storage system but not known to the storage system;

to encrypt the data item using the data encryption key for the data item;

to encrypt the data encryption key using a secret key of the client device, the data encryption key thereby being encrypted under the secret key of the client device, the secret key being different than the data encryption key, wherein the secret key is stored in a trusted platform module of the client device, and the encryption of the data encryption key is performed in the trusted platform module using the secret key stored therein;

to send the encrypted data item and the encrypted data encryption key from the client device to the storage system for storage therein;

to retrieve, in the client device, the encrypted data item and the encrypted data encryption key from the storage system; and to perform, in the client device, an integrity check on the retrieved encrypted data item using a result of decrypting the retrieved encrypted data encryption key;

wherein performing an integrity check on the retrieved encrypted data item using a result of decrypting the retrieved encrypted data encryption key comprises:

decrypting the retrieved encrypted data encryption key using the secret key of the client device, wherein the decryption of the data encryption key is performed in the trusted platform module of the client device using the secret key stored therein, without requiring the involvement of any other device;

decrypting the retrieved encrypted data item using the decrypted retrieved encrypted data encryption key;

computing the function of at least the decrypted retrieved encrypted data item; and comparing a result of computing the function of at least the decrypted retrieved encrypted data item to the decrypted retrieved encrypted data encryption key;

wherein the integrity check passes if the result of computing the function of at least the decrypted retrieved encrypted data item is equivalent to the decrypted retrieved encrypted data encryption key, and the integrity check fails if the result of computing the function of at least the decrypted retrieved encrypted data item is not equivalent to the decrypted retrieved encrypted data encryption key.

9. The computer program product of claim 8 wherein the integrity check is performed in its entirety within the trusted platform module of the client device.

10. The computer program product of claim 8 wherein generating a data encryption key for a data item by computing a function of at least the data item comprises compressing the data item to generate a compressed data item and generating the data encryption key as a function of at least the compressed data item.

11. The computer program product of claim 8 wherein the encrypted data encryption key is stored in the storage system as metadata of the encrypted data item.

12. The computer program product of claim 11 wherein the metadata of the encrypted data item further comprises a pointer to a storage location of the encrypted data item in the storage system.

13. The computer program product of claim 8 wherein the multiple client devices are associated with respective distinct tenants of the deduplication domain of the storage system.

14. A method performed in a client device configured to communicate with a storage system, the client device comprising a processor coupled to a memory, the method comprising:

generating a data encryption key for a data item at least in part by computing a function of at least the data item, wherein computing the function of at least the data item comprises applying one or more secure hashing algorithms to at least the data item and a per-domain secret, the per-domain secret being shared by multiple client devices within a deduplication domain of the storage system but not known to the storage system;

encrypting the data item using the data encryption key for the data item;

encrypting the data encryption key using a secret key of the client device, the data encryption key thereby being encrypted under the secret key of the client device, the secret key being different than the data encryption key, wherein the secret key is stored in a trusted platform module of the client device, and the encryption of the data encryption key is performed in the trusted platform module using the secret key stored therein;

sending the encrypted data item and the encrypted data encryption key from the client device to the storage system for storage therein;

retrieving, in the client device, the encrypted data item and the encrypted data encryption key from the storage system; and performing, in the client device, an integrity check on the retrieved encrypted data item using a result of decrypting the retrieved encrypted data encryption key;

wherein performing an integrity check on the retrieved encrypted data item using a result of decrypting the retrieved encrypted data encryption key comprises:

decrypting the retrieved encrypted data encryption key using the secret key of the client device, wherein the decryption of the data encryption key is performed in the trusted platform module of the client device using the secret key stored therein, without requiring the involvement of any other device;

decrypting the retrieved encrypted data item using the decrypted retrieved encrypted data encryption key;

computing the function of at least the decrypted retrieved encrypted data item; and comparing a result of computing the function of at least the decrypted retrieved encrypted data item to the decrypted retrieved encrypted data encryption key;

wherein the integrity check passes if the result of computing the function of at least the decrypted retrieved encrypted data item is equivalent to the decrypted retrieved encrypted data encryption key, and the integrity check fails if the result of computing the function of at least the decrypted retrieved encrypted data item is not equivalent to the decrypted retrieved encrypted data encryption key.

15. The method of claim 14 wherein the integrity check is performed in its entirety within the trusted platform module of the client device.

16. The method of claim 14 wherein generating a data encryption key for a data item by computing a function of at least the data item comprises compressing the data item to generate a compressed data item and generating the data encryption key as a function of at least the compressed data item.

17. The method of claim 14 wherein the encrypted data encryption key is stored in the storage system as metadata of the encrypted data item.

18. The method of claim 17 wherein the metadata of the encrypted data item further comprises a pointer to a storage location of the encrypted data item in the storage system.

19. The method of claim 14 wherein computing a function of at least the data item comprises computing a function of the data item and the per-domain secret shared by the multiple client devices but not known to the storage system.

20. The method of claim 14 wherein the multiple client devices are associated with respective distinct tenants of the deduplication domain of the storage system.

* * * * *